United States Patent

Fujita et al.

[11] Patent Number: 6,106,726
[45] Date of Patent: *Aug. 22, 2000

[54] METHOD OF TREATING SLUDGE CONTAINING ARSENIC

[75] Inventors: Hiroshi Fujita; Koosoo Tao, both of Hiroshima; Taku Shimizu; Mamoru Yokose, both of Tokyo, all of Japan

[73] Assignee: Mitsubishi Heavy Industries, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/065,878

[22] Filed: Apr. 24, 1998

[51] Int. Cl.$^7$ ........................................ C02F 1/58
[52] U.S. Cl. ..................... 210/710; 210/713; 210/724; 210/911
[58] Field of Search .................... 210/724, 710, 210/911, 713, 726, 769

[56] References Cited

U.S. PATENT DOCUMENTS

| 5,378,366 | 1/1995 | Yen ........................................ 210/667 |
| 5,618,439 | 4/1997 | Allgulin ................................. 210/911 |
| 5,840,194 | 1/1995 | Yokose et al. .......................... 210/710 |

FOREIGN PATENT DOCUMENTS

| 51-20485 | 2/1976 | Japan .................................... 210/911 |

*Primary Examiner*—David A. Simmons
*Assistant Examiner*—Frank M. Lawrence
*Attorney, Agent, or Firm*—Foley & Lardner

[57] ABSTRACT

A method of treatment of an arsenic sludge obtained from a solid-liquid separation step on arsenic waste water by adjusting the value of pH to 12 or higher by adding a calcium compound is disclosed. The method is characterized by addition of hydrated lime and calcining the sludge.

3 Claims, 5 Drawing Sheets

METHOD OF TREATING SLUDGE CONTAINING ARSENIC

BACKGROUND OF THE INVENTION

This invention relates to the treatment of arsenic-containing sludge discharged after coagulation sedimentation treatment of liquid-waste for conversion into environmentally harmless constituents.

Methods for treating arsenic-containing waste water, as have been known, include the adsorption method, the ion-exchange method, the sulfide coagulation method, the hydroxide coprecipitation, and the like. Among these methods, the hydroxide coprecipitation method using calcium chloride, magnesium chloride, ferric chloride and the like is most common. FIG. 2 shows an example of flowcharts for this hydroxide coprecipitation method.

The arsenic-containing waster water 24 discharged from various types of plants flows into the reaction chamber 21. Arsenic is present in the waste water in the form of $As^{3+}$ arsenic trioxide ion ($AsO_3^{3-}$) and $As^{5+}$ arsenic acid ion ($AsO_4^{3-}$). When calcium chloride or ferrous chloride is added to this waste water, the reaction according to the following formula takes place to produce calcium arsenate, calcium arsenite or ferrous arsenate, which then precipitate. FIG. 2 illustrates the case in which hydrated lime is added as a representative additive.

$$3Ca^{2+}+2AsO_3^{3-} \rightarrow Ca_3(AsO_3)_2 \quad (1)$$

$$3Ca^{2+}+2AsO_4^{3-} \rightarrow Ca_3(AsO_4)_2 \quad (2)$$

$$Fe^{3+}+AsO_3^{3-} \rightarrow FeAsO_3 \quad (3)$$

$$Fe^{3+}+AsO_4^{3-} \rightarrow FeAsO_4 \quad (4)$$

Along with these reactions, calcium chloride and ferric chloride act as a coagulant, and the arsenic compounds formed in accordance with the foregoing equations (1), (2), (3) and (4) form particulate which gradually coarsen.

Next, this reaction fluid is led to a sedimentation tank 22 and the like to separate the solid matter, and the supernatant fluid is drained out of the system as a treated water 26, and the sediment of arsenic-containing sludge 27 is drawn from the bottom and processed by a dehydrator 23 to produce a dehydrated sludge cake 29. Further, a portion of is the sediment of the sludge 27 is returned to the reaction tank 21 as returned sludge 28.

However, the aforementioned conventional art has the following problems:

1) There has been no consistent treatment method established from waste treatment to sludge treatment. That is to say, the conventional art remained as a treatment process to extract arsenic from waste water into the sludge and failed to provide a process in succession to convert the arsenic formed then in the sludge to innocuous matter, posing many environmental problems.

2) If the sludge containing arsenic compounds produced in the treatment process of waste water is disposed and left in the environment after mere dehydrating and drying, arsenic components come out again with exposure to rainwater or underground water to become a new source of environmental pollution.

SUMMARY OF THE INVENTION

This invention is to resolve these problems of the conventional art and offer a method for treating the arsenic-containing sludge, which is obtained from the sedimentation treatment of waste water, to be free from fear of the re-elution of arsenic in the environment.

This invention has been made to solve the aforementioned problems.

In one aspect of the present invention, there is provided a method of treating a sludge containing arsenic comprising the steps of adjusting the value of pH to be 12 or higher by adding a calcium compound to a waste water containing arsenic; obtaining a sludge containing arsenic by solid-liquid separation; adding hydrated lime to the solid-liquid separated sludge containing arsenic; and calcining the sludge.

In a preferred embodiment of the present invention, the value of (A+B)/C (index of excess Ca) is within the range of 1.5–3.0, wherein A represents the mole number of the calcium compound to be added to adjust the value of pH to 12 or higher, and B represents the mole number of the hydrated lime to be added to the arsenic-containing sludge, C represents the total mole number of the calcium compound to neutralize the acidic waste water and to react with arsenic present in the waste water.

In another preferred embodiment of the present invention, the temperature of said calcination is 650–900° C.

According to the present invention of a treatment of arsenic sludge, the insolubilized arsenic in the calcined sludge is very high in stability, and;

1) When the calcined matter is disposed or placed in a landfill as an industrial waste, arsenic compounds do not elute into rainwater or underground water. Such elution satisfies the value of 0.3 mg/liter at maximum set in the Japanese waste disposal regulations, and does not pose a fear for a new public pollution source;

2) The arsenic compounds may be thermally cracked during the calcination of the arsenic sludge, and the release of gasified arsenic into the air can be prevented, contributing to the environmental safety.

DESCRIPTION OF THE PREFERRED EMBODIMENTS

The working of this invention will be illustrated next. Arsenic ions and other heavy metals form floc when the value of pH is adjusted to 12 or higher by addition of a calcium compound to an arsenic containing waste water. As for the calcium compound, calcium hydroxide (hydrated lime, slaked lime), calcium oxide (calcined lime), calcium carbonate, calcium chloride and the like, or a mixture thereof can be used. The floc is removed from the reaction fluid, while returning a portion of the sludge into the untreated waste water. The residue is dehydrated, and after drying, added with an additional hydrated lime, and calcined. The calcined material produced by the above method is a more stable compound with calcium, and when disposed in landfill, said compound does not elute with underground water or rainwater, minimizing impacts to the environment.

In an embodiment of this invention, it is desirable to have the value of (A+B)/C (index of excess Ca) is within the range of 1.5–3.0 in the process of adjusting the value pH to 12 or higher, wherein A represents the mole number of the calcium compound to be added, and B represents the mole number of the hydrated lime to be added to the arsenic-containing sludge before calcination, and C represents the total mole number of the calcium compound for neutralizing the acidic waste water and that for reacting with arsenic in the waste water.

The amount of calcium compound necessary to adjust the value of pH in waste water to 12 varies depending on the condition such as the rate of addition. When the calcium compound is dehydrated lime, this amount is normally around 1.1–1.2 in terms of the index of excess Ca (A/C) under the conditions to form a plate gypsum which is large in crystal and easy to filter from the reaction of sulfuric acid ($SO_4$) in the waste water with dehydrated lime. That is to say, in the process of adjustment of the value of pH to 12 or higher, the amount of added calcium compound is ordinarily around 1.1–1.5 in terms of the index of excess Ca (A/C).

The amount of dehydrated lime to be added to the arsenic-containing sludge before calcination is made so as to have the index of excess Ca [(A+B)/C] being within the range of 1.5–3.0. When the Ca excess index is less than 1.5, the effect is small, and, when it exceeds 3.0, costs would be disadvantageously higher. Further, in the process to adjust the value of pH to 12 or higher, even in the case where the amount of calcium compound exceeds 1.5 in terms of the Ca excess index (A/C), the amount of arsenic eluting from the calcined sludge decreases by the addition of dehydrated lime to the arsenic containing sludge before calcination.

Figure 1:
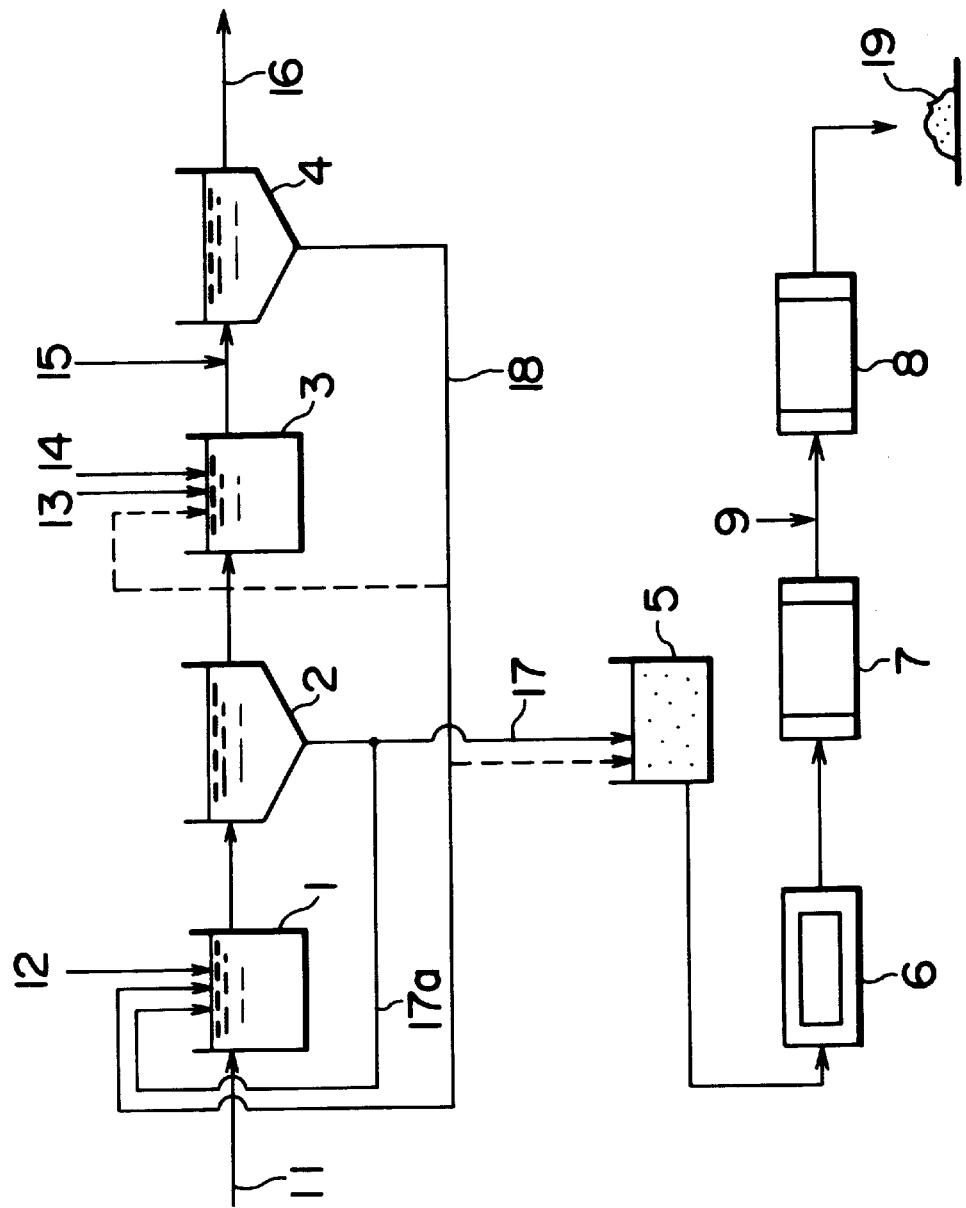
FIG. 1 is a flowchart of a process embodying a method of treatment of an arsenic sludge of the invention.
Figure 2:
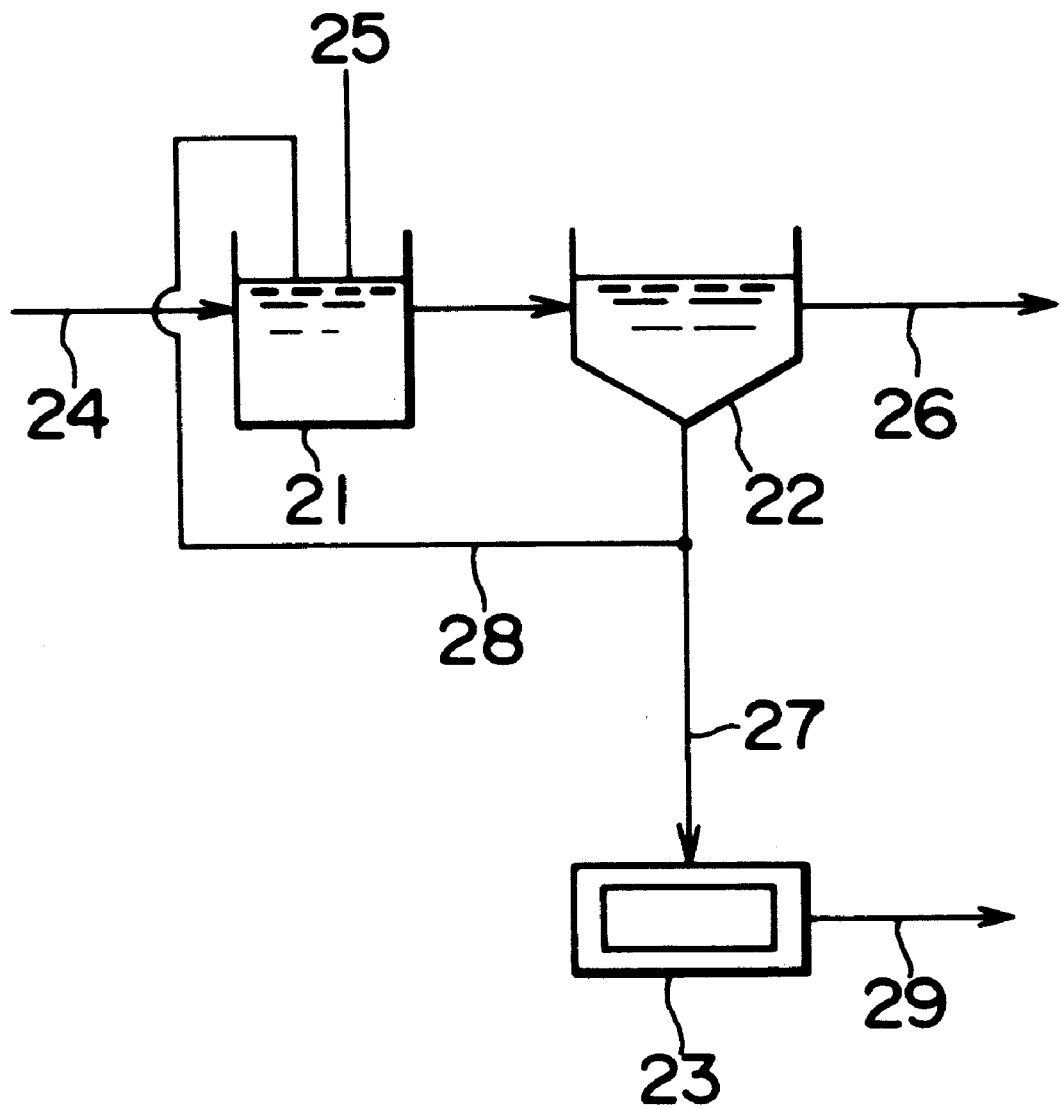
FIG. 2 is a flowchart of a process embodying an example of treatment of an arsenic sludge of the conventional art.

Next an embodiment of this invention is explained based on FIG. 1, which is an illustration for a working example process of this invention. In FIG. 1, the first reaction tank 1 is for introduction of waste water in which the value of pH thereof is adjusted by hydrated lime and the like; the first coagulation sedimentation tank 2 is for separating the coagulation formed in the first reaction tank by precipitation or sedimentation; the second reaction tank 3 is for the introduction of the supernatant fluid discharged from the first coagulation sedimentation tank 2 and the addition of a coagulant as well as for the adjustment of the pH value; the second coagulation sedimentation tank 4 is for separating, by sedimentation, the coagulation formed in the second reaction tank 3; and the storage tank 5 receives and stores the sludge containing arsenic compounds separated by sedimentation in the first coagulation sedimentation tank and the second coagulation sedimentation tank. The sludge supplied from the storage tank of sludge 5 is dehydrated in the dehydrator 6, and the drying machine 7 is used to dry the cake produced by the dehydrator 6. The calcinator 8 is used to calcine the dried solid matter produced by the drying machine 7.

In the foregoing system, the arsenic-containing waste water 11 discharged from all kinds of plants flows in the first reaction tank 1. The addition of the hydrated lime 12 as calcium compound to this waste water for adjustment of the value of pH to 12 or higher generates hydroxide floc of heavy metals such as iron and copper besides calcium arsenate and calcium arsenite. Next, this reaction fluid is introduced in the first coagulation sedimentation tank 2 for solid-liquid separation. The solid-liquid separation is not necessarily limited to be made in the method described herein, and, for instance, separation may possibly be made by filtering. A portion of the first coagulation sedimentation sludge drawn out from the bottom of the first coagulation sedimentation tank, after being stored still therein, is returned to the first reaction tank 1 as the returning sludge 17a to be mixed with the untreated waste liquid for acceleration of floc generation, while the remaining portion is stored in the sludge storage tank 5.

When the sludge in the sludge storage tank 5 reaches a fixed amount, the sludge is supplied to the dehydrator 6 of such a kind as filter press or centrifugal separator, and dehydrated. Then, the sludge is supplied to the drying machine 7 and dried at a temperature of around 200° C, and after the addition of hydrated lime 9, supplied to the calcinator 8 for calcination. The calcined material 19 obtained according to this method, when disposed in landfill or disposed as specific hazardous industrial waste, does not elute hazardous components such as arsenic into underground water or rainwater, and environmental impacts are minimized. The addition of the hydrated lime 9 can be made after the dehydrator 6 and before the drying machine 7.

The treated fluid after the solid-liquid separation in the foregoing first coagulation sedimentation tank 2 is introduced into the second reaction tank 3, and by adjusting the value of pH to 6–9 with the addition of iron salt (for example, ferric chloride 14) and acid (for example, hydrochloric acid 13), the residual arsenic in the fluid becomes ferric arsenate and coprecipitates being incorporated into the floc of ferric hydroxide which is generated at the same time. As for the iron salt, ferric hydroxide and ferric sulfate are considered, however, among them ferric sulfate generates calcium sulfate which increases the sludge amount and not desirable, and ferric hydroxide is most suitable.

This reaction fluid is introduced into the second coagulation sedimentation tank 4. In this case, further addition of macromolecular coagulant 15 into the second coagulation sedimentation tank 4 or in the middle of the entrance tube coarsens the floc, and the sedimentation separation becomes easier. Also in this case, the solid-liquid separation has no needs to be limited to be the one described herein, it is possible, for instance, to employ filtering. After being left still in the second coagulation sedimentation tank 4, the second coagulation sedimentation sludge 18 is either returned to the first reaction tank 1 or returned to the second reaction tank 3 to accelerate the formation of the floc.

With this, the supernatant fluid separated in the second coagulation sedimentation tank 4 is almost completely removed of arsenic and can be discharged as a treated water 16 which satisfies various effluent standards.

WORKING EXAMPLES

Example 1

By adding hydrated lime to the arsenic waste water from a sulfuric acid plant in a copper refining factory, the value of pH in the waste water was adjusted to be more than 12 (the Ca excess index was 1.43). A sample was prepared by calcination after the addition of more hydrated lime to the dried sludge having the composition shown in Table 1 obtained after filtration. An elution test was carried out on this sample in compliance with a standard poisonous elution test provided by the US Environmental Protection Agency (EPA Method 1311), and FIG. 3 shows the results of the test done on the relation between the index of excess Ca including the additional hydrated lime and the results of the elution test (the amount of elution).

TABLE 1

| Composition (wt %) | | | | |
|---|---|---|---|---|
| CaO | SO$_4$ | Fe$_2$O$_3$ | CuO | As$_2$O$_3$ |
| 41.0 | 40.9 | 0.5 | 0.5 | 8.0 |

Figure 3:
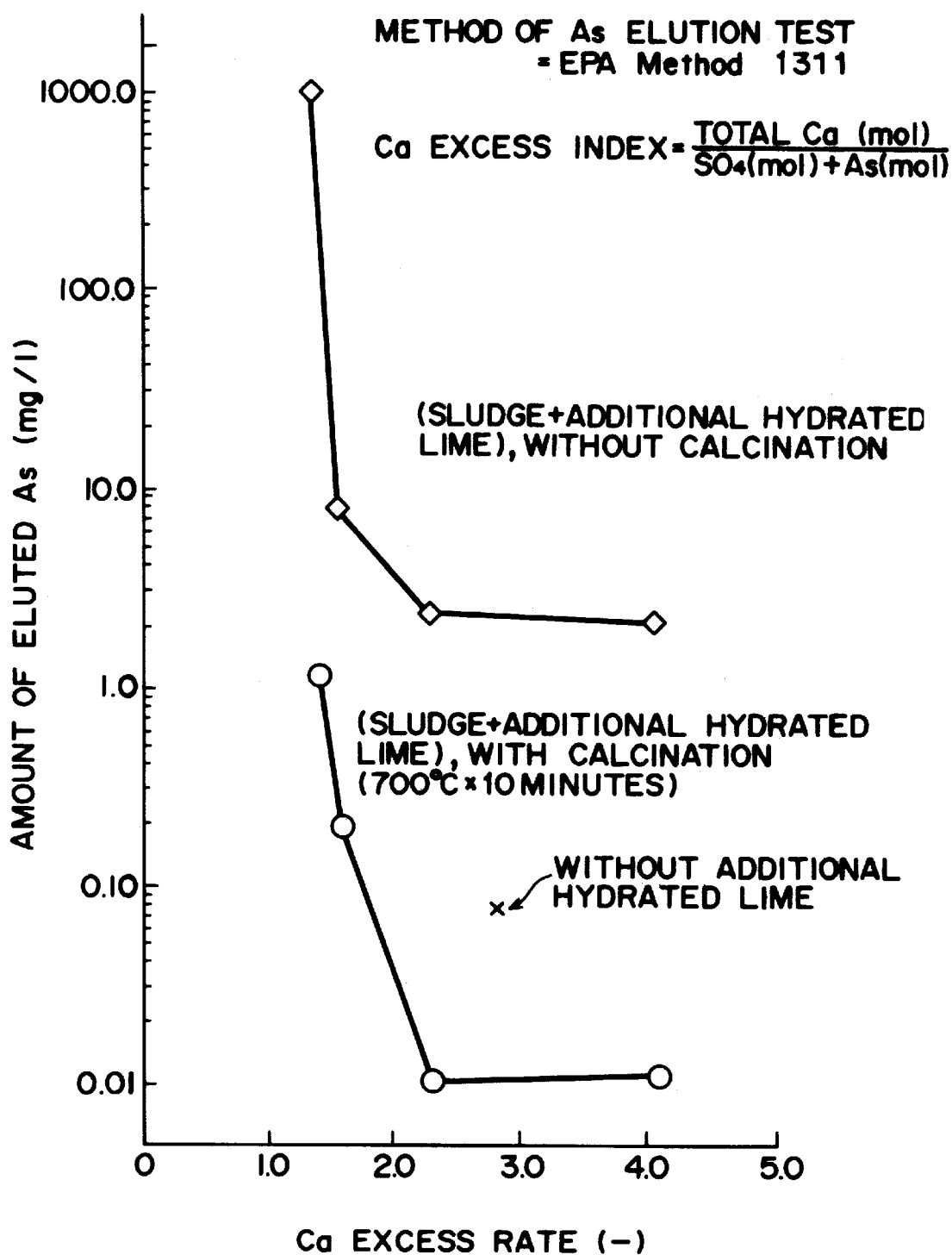
FIG. 3 shows the relation between the Ca excess rate and the amount of As elution in the sludge treatment test as in Example 1.

As a result, as shown in FIG. 3, the amount of eluted arsenic decreased by the further addition of hydrated lime even in the case that arsenic as As$_2$O$_3$ is present in a large amount of 8.0 wt % in the dehydrated sludge, and moreover, it was found that the calcination of the sludge to which the additional hydrated lime was added was effective in accelerating further the insolubility of the arsenic.

Setting the Ca excess index at 2.8 in the stage of adding hydrated lime to the waste water to adjust the value of pH, a similar elution test was carried out on the sample prepared by calcining the sludge without adding additional hydrated lime after the separation, the result was 0.07 mg/liter (marked x in FIG. 3), and, setting the Ca excess index at 1.43 in the stage of adjusting the value of pH to 12 or more, and after separation of the sludge, additional hydrated lime was added to make the Ca excess index equal to 2.8 and the sludge was calcined, and the result was 0.01 mg/liter as seen in FIG. 3. From the foregoing, the effectiveness of the addition of additional hydrated lime in the stage of calcination is apparent.

When the elution test of arsenic was made in accordance with the method of the Japanese Prime Minister's Office Advice No. 13 ("Assay Method for Hazardous Substances Contained in the Industrial Waste"), the elution concentration of arsenic was 1/40–1/100 of that specified in the EPA Method 1311, and it was ascertained that the value of 0.3 mg/liter of the Waste Disposal Regulations for Arsenic Elution is easily achieved by addition of hydrated lime even in the case of no calcination.

Example 2

Figure 4:
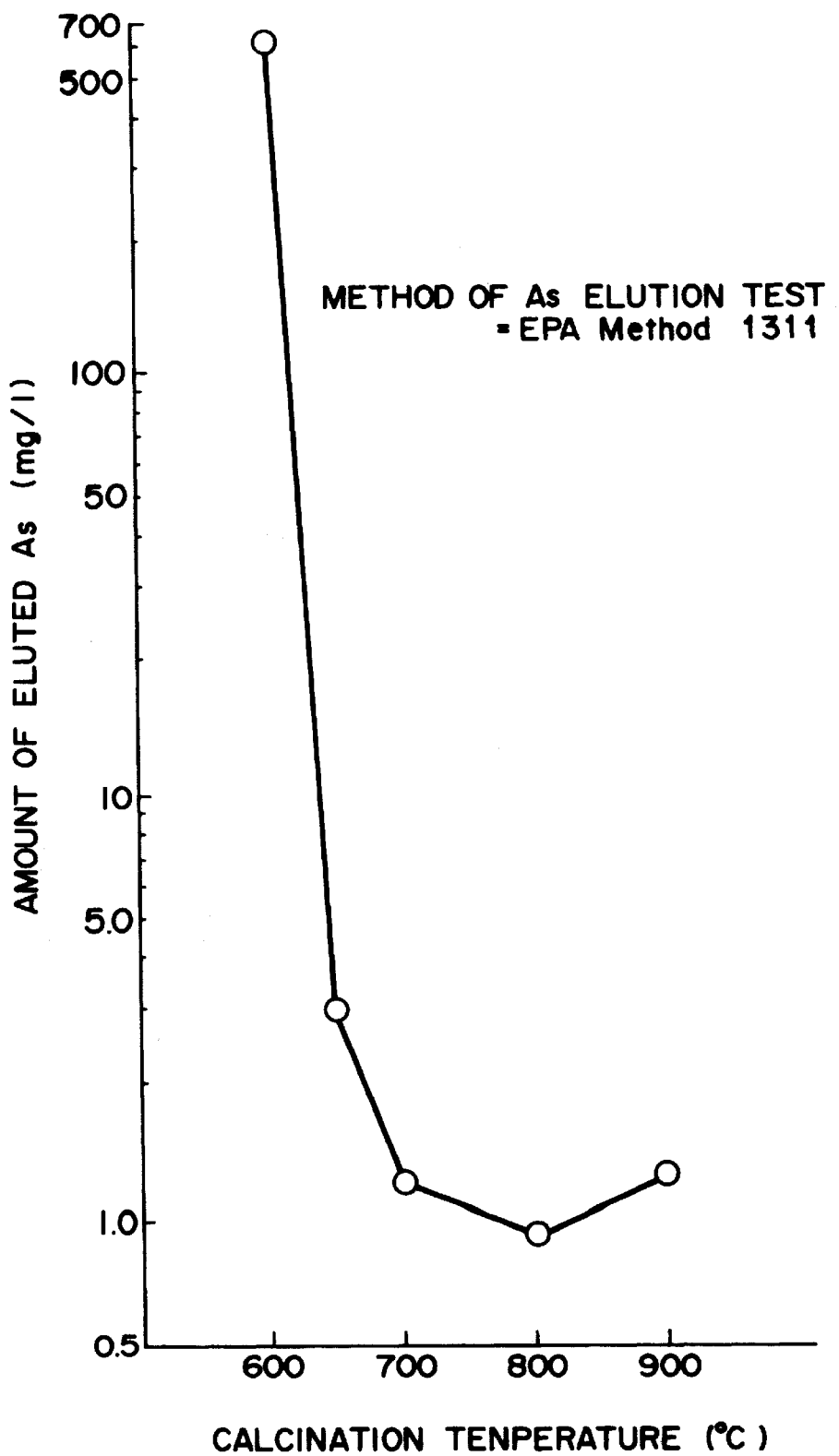
FIG. 4 shows the relation between the calcination temperature and the amount of As elution in the sludge treatment test as in Example 2.

An elution test of arsenic was made in accordance with the EPA Method 1311 on the same sludge (no additional hydrated lime) as in Example 1 by calcination of changing temperature. FIG. 4 shows the results. It was proved, as seen in FIG. 4, that the calcination in the temperature of over 650° C. accelerated the insolubility of the arsenic in the sludge and possessed the elution decreasing effects of arsenic.

That the trivalent compound As$^{3+}$ in the sludge was converted into the pentavalent compound As$^{5-}$ by calcination at 650° C or higher was ascertained by X-ray diffraction analysis and photoelectron spectrum analysis made on the calcined material. Therefore, in an ordinary case, it is not necessary to oxidize As$^{3+}$ by adding an oxidizing agent to the arsenic waste water to convert As$^{3+}$ into the insoluble As$^{5+}$.

Example 3

Figure 5:
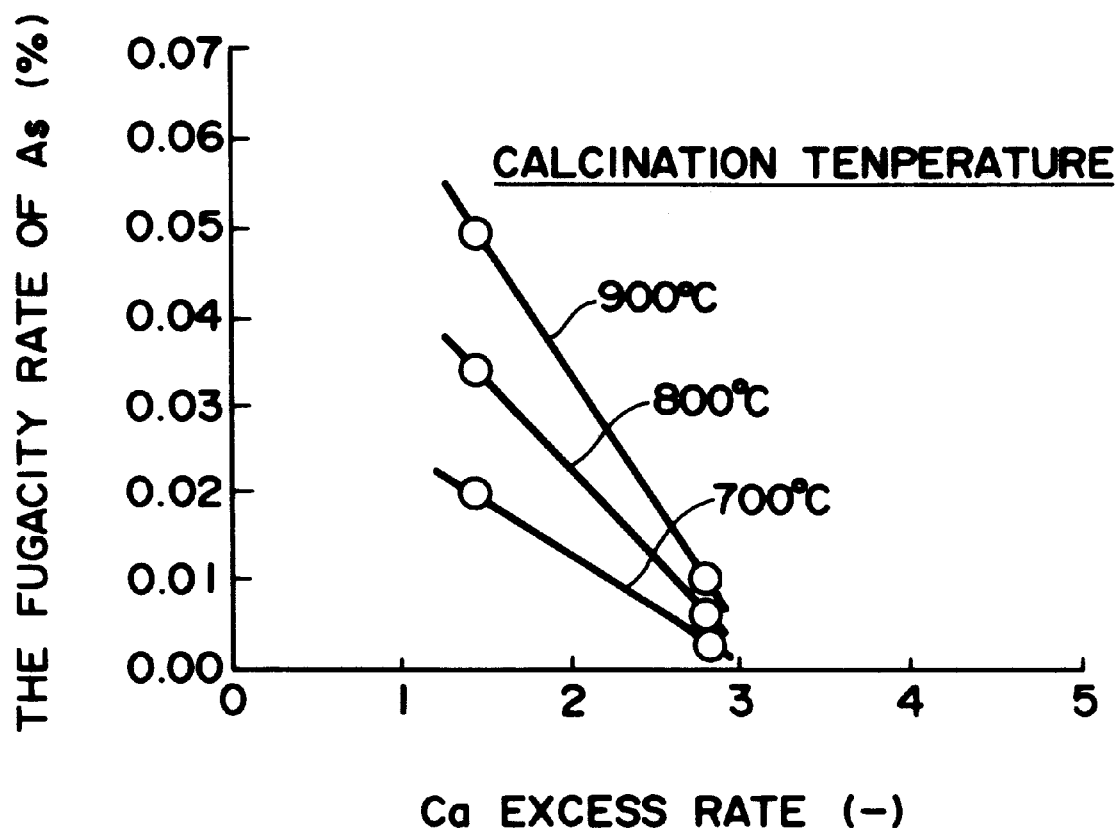
FIG. 5 shows the relation between the Ca excess rate and the fugacity rate of As under calcination in the sludge treatment test as in Example 3.

There is a danger of releasing the gasified arsenic into the atmosphere when the arsenic sludge is calcined and arsenic compounds become thermally cracked. Therefore, the relation between the calcining temperature and the release of arsenic by thermolysis was examined by changing the Ca excess index by addition of additional hydrated lime to the same sludge as in the Example 1. FIG. 5 shows the results. As shown in FIG. 5, it was shown that the increase of Ca excess index by addition of additional hydrated lime decreased the release of arsenic into gas phase and was effective from the viewpoint of the air pollution control.

Many other variations and modifications of the invention will be apparent to those skilled in the art without departing from the spirit and scope of the invention. The above-described embodiments and working examples are, therefore, intended to be merely exemplary, and all such variations and modifications are intended to be included within the scope of the invention as defined in the appended claims.

The entire disclosure of Japanese Patent Application No. 8-286623 filed on Oct. 29, 1996 including specification, claims, drawings and summary are incorporated herein by reference in its entirety.

What is claimed is:

1. A method of treating a sludge containing arsenic comprising the steps of adjusting the value of pH to be 12 or higher by adding a calcium compound to an acidic waste water containing arsenic; obtaining a sludge containing arsenic by solid-liquid separation; adding hydrated lime to the solid-liquid separated sludge containing arsenic; and calcining the sludge, wherein the method is characterized in that the value of (A+B)/C (index of excess Ca) is within the range of 1.5–3.0, wherein A represents the mole number of the calcium compound to be added to adjust the value of pH to 12 or higher, and B represents the mole number of the hydrated lime to be added to the arsenic-containing sludge, C represents the total mole number of the calcium compound used to neutralize the acidic waste water and to react with arsenic present in the waste water.

2. The method of treating the arsenic-containing sludge as in claim 1, or which is characterized in that the temperature of said calcination is 650–900° C.

3. The method according to claim 1, wherein the sludge is subjected to one or more dehydrating and drying steps before the sludge is calcined, and wherein the lime is added either before or after said dehydrating or drying steps.

* * * * *